United States Patent Office 3,429,881
Patented Feb. 25, 1969

3,429,881
DIAMINO-TRIAZINE DERIVATIVES
Enrico Knüsli, Riehen, and Jürg Rumpf, Binningen, Basel-Land, Switzerland, assignors to J. R. Geigy A.G., Basel, Switzerland
No Drawing. Continuation-in-part of application Ser. No. 170,263, Jan. 31, 1962. This application Sept. 10, 1963, Ser. No. 307,776
Claims priority, application Switzerland, Feb. 1, 1961, 1,153/61, 1,154/61
U.S. Cl. 260—249.8      8 Claims
Int. Cl. C07d 55/48; A01n 9/22

This application is a continuation-in-part of our pending application Ser. No. 170,263 filed Jan. 31, 1962, now U.S. Patent No. 3,385,854.

The present invention relates to new triazine derivatives with herbicidal and fungicidal properties, processes for their preparation, agents containing the new triazine derivatives and the use of these new triazine derivatives and said agents containing them for the suppression of plant growth, especially for weed control and for the protection of organic materials and articles from fungal attack.

2,4-dihalo-6-amino-s-triazines of the general formula

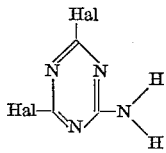

the amino group of which may possibly be mono- or di-substituted by alkyl or alkenyl groups are already known.

2,4-dihalo-s-triazine derivatives which carry a substituent in the 6-position which are derived from hydroxylamine and its O- and N-substitution products, and 4,6-diamino-s-triazine derivatives, substituted in the 2-position in various ways, in which at least one amino radical is derived from hydroxylamine and its O- and N-substituted products, which therefore have at least one —N—O— linkage, have not previously been known.

In one aspect of the invention it has now been found that s-triazine derivatives of the general formula

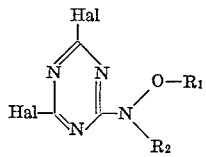

in which Hal represents halogen atoms such as chlorine, bromine or fluorine, $R_1$ represents a lower saturated or lower unsaturated aliphatic hydrocarbon radical, and $R_2$ represents hydrogen or a lower alkyl or lower alkenyl, preferably hydrogen or lower alkyl radical, possess an excellent fungicidal activity and may also be herbicidally active.

The compounds of the general Formula II are especially distinguished, apart from the moderate herbicidal action, by their very marked fungicidal action.

In Formula II, "lower" means radicals containing 1 to 4 carbon atoms. Generally the two halogen atoms in the 2,4-dihalogen-s-triazines of Formula II are identical and, preferably, both are chlorine atoms. By saturated or unsaturated aliphatic radicals in the definition of $R_1$ alkyl, alkenyl and alkinyl radicals, preferably alkyl, are meant. Examples of $R_1$ radicals are methyl, allyl, ethyl, vinyl, ethinyl, propyl, isopropyl, propenyl, propargyl etc. As examples of $R_2$ radicals, there are methyl, ethyl, vinyl, propyl, isopropyl, propenyl etc.

For the preparation of the above-defined new s-triazine derivatives, a cyanuric acid trihalide, such as cyanuric chloride, cyanuric bromide or cyanuric fluoride, is reacted, in the presence of a hydrohalic acid-binding agent, with one mol of a hydroxylamine derivative of the general formula

in which $R_1$ and $R_2$ have the meanings given above.

As the agent for binding hydrohalic acid, a molar excess of the hydroxylamine to be reacted or alkali metal hydroxides or carbonates may be employed for this purpose. The reactions may be carried out in an inert organic solvent, e.g., a hydrocarbon or halogenated hydrocarbon of the benzene series, or in aqueous phase.

Suitable starting substances of the general Formula IV are, for example, O-methyl-, O-ethyl-, and O-isopropyl-hydroxylamines, O,N-dimethyl-, O,N-diethyl- and O,N-diisopropyl - hydroxylamines, O-methyl-N-ethyl-hydroxylamine, etc.

The 2,4-dihalogen-6-amino-s-triazines of the general Formula II as mentioned above, in addition to a rather moderate herbicidal action, have a marked fungicidal activity. They are particularly suitable for the control and prevention of growth of fungi particularly on plants and parts thereof (plant protection). They can also be employed however for the protection of organic materials of all types such as wood, textiles, hides, leather, paper, synthetic materials, etc. from attack and decomposition by fungi.

Examples of fungi that may be treated with compounds of Formula II are *Alternaria tenuis, Coniothyrium diplodiella, Clasteriosporium c., Fusarium culmorum,* Mucor spec., Stemphylius cons., Penicillium spec., *Venturia, Plasmopora viticola, Erysiphe polyphaga, Erysiphe graminis* and *Botrytis cinerea.*

The active ingredients according to this first aspect of the invention can be used in known ways, either per se or in combination with conventional agricultural adjuvants, e.g., the usual pulverulent solids, semi-solid (slavelike), liquid or gaseous carriers, diluents, and/or distributing (dispersing) agents. The agricultural adjuvants should be inert to the active ingredients of Formula II.

The fungicidal active substances of general Formula II are used in finely distributed form as such or combined with suitable carriers and distributing agents. They can also be employed in combination with other fungicidal or bactericidal substances such as fungistatica and bacteriostatica. To widen the range of action, the fungicidal active substances for use according to this aspect of the invention can also be combined with insecticidal or nematocidal substances.

To produce fungicidal agents, solid active substances of Formula II can be combined with solid pulverulent carriers such as, e.g. talcum, kaolin, bole, bentonite, chalk or ground limestone. The pulverulent fungicides obtained can be made suspendable in water if desired by the addition of suitable wetting and dispersing agents such as sulphite waste liquor. Also the fungicidal active substances in solid finely ground form can be suspended in water with the aid of surface active agents or, after being dissolved in organic solvents, can be emulsified in water with the aid of suitable emulsifying agents. In addition, these active substances can also be dissolved in organic solvents, e.g., in chlorinated hydrocarbons such as trichloroethylene, or in petroleum fractions of medium boiling range, possibly with the addition of auxiliary solvents such as acetone or higher ketones. Finally, the fungicidal active substances can be distributed in the air in the form of aerosols, smoke or mist, this particularly in storerooms and greenhouses.

The fungicidal active substances are applied to the organic material to be protected generally either by mixing therewith, by spraying or by impregnating with organic-aqueous or aqueous-alkaline solutions of the active substances, or by washing, cleaning or rinsing liquors containing the active substance dissolved or dispersed therein. Examples of such organic material to be protected are mainly cellulose fabrics, wood pulp fibres, wood and paper.

According to a second aspect of the invention it has been found that new s-triazine derivatives of the general formula

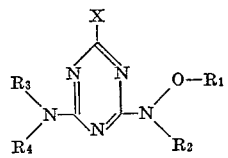
III in which X represents a halogen atom, a lower alkyl or lower haloalkyl residue or a lower alkoxy, lower alkenyloxy, lower alkylmercapto or lower alkenyl mercapto group, $R_1$ represents a lower saturated or lower unsaturated aliphatic hydrocarbon radical, $R_2$ and $R_4$, independently of one another, represent hydrogen or lower alkyl or lower alkenyl radicals, and $R_3$ represents hydrogen, a lower alkyl, lower alkenyl or lower akanoyl residue or a —$OR_1$ group as well as salts of such triazine derivatives which are capable of forming salts with acids, e.g., acids of the type A—COOH wherein A is a halogenated alkyl, halogenated alkenyl, halogenated carboxyalkyl and halogenated carboxyalkenyl (halogenated alkyl carboxylic acids are particularly suitable especially trichloroacetic acid), possess herbicidal and fungicidal activity.

Compounds of Formula III and their salts are particularly distinguished by a more markedly excellent herbicidal action than a fungicidal action. Compounds of Formula III are excellently suited as active substances in agents for the suppression of plant growth, especially in weed control agents for the total or selective suppression of undesired plant growth, and are superior in many respects to previously known compounds of the s-triazine series.

In the Formula III "lower" embraces radicals containing 1 to 4 carbon atoms. By saturated or unsaturated aliphatic radicals in the definition of $R_1$ alkyl, alkenyl and alkinyl radicals, preferably alkyl, are meant. Therein X is preferably fluorine, chlorine, bromine, lower alkyl, e.g., methyl, ethyl, isopropyl etc., lower alkoxy, e.g., methoxy, ethoxy, isopropoxy, propoxy, etc. or lower alkylmercapto, e.g., methylmercapto, ethylmercapto, propylmercapto, isopropylmercapto, etc. $R_1$ is preferably lower alkyl, e.g., methyl, ethyl, propyl, isopropyl, butyl, etc. $R_2$ is preferably hydrogen or lower alkyl, e.g., methyl, ethyl, propyl, isopropyl, butyl, etc. $R_3$ is preferably lower alkyl, e.g., methyl, ethyl, propyl, isopropyl, etc., or lower alkoxy, e.g., methoxy, ethoxy, propoxy, isopropoxy, etc., and $R_4$ is preferably hydrogen or lower alkyl, e.g., methyl, ethyl, propyl, isopropyl etc. Further examples of X substituents are monochloromethyl, dichloroethyl, monobromoethyl, allyloxy etc. Additional examples of $R_2$ and $R_4$ radicals are vinyl, propenyl, isopropenyl etc. Further examples of $R_3$ radicals are vinyl, propenyl, acetyl, propionoyl, methoxy, ethoxy etc. while additional examples of $R_1$ radicals are vinyl, ethinyl, propenyl etc.

The active ingredients of Formula III embrace those 2-substituted 4,6-diamino-s-triazines in which one or both amino groups are substituted, e.g., by an alkoxy or alkenyloxy radical, as the radical $R_3$ can also be a group —$OR_1$.

The preparation of the new compounds of the general Formula III may take place according to methods known per se, differing according to the constitution of the end product.

End substances of the general Formula III in which X represents a halogen atom are obtained, for example, by reacting, in the presence of a hydrohalic acid-binding agent, a cyanuric acid trihalide, such as cyanuric chloride, with 2 mol of a hydroxylamine derivative of the general formula

IV or, in any optional sequence with one mol each of such a hydroxylamine derivative and an amine of the general formula

V $R_1$, $R_2$ and $R_4$ in the Formulae IV and V having the meanings given above, and $R'_3$ representing a residue corresponding to $R_3$ but excluding the —$OR_1$ group.

Suitable starting materials of the general Formula IV are, for example, O-methyl, O-ethyl, and O-isopropyl-hydroxylamines, O,N-dimethyl-, O,N-diethyl- and O,N-di-isopropyl-hydroxylamines, O-methyl-N-ethyl-hydroxylamine etc.

Suitable starting materials of the general Formula V are, e.g., methylamine, dimethylamine, ethylamine, diethylamine, isopropylamine, di-isopropylamine, allylamine, N-ethylacetamide, N-ethylacetamide etc.

End substances of the general Formula III, in which X represents a residue other than halogen, may be obtained starting from cyanuric acid trihalides, such as cyanuric chloride, before or preferably after the above mentioned reaction with in all 2 mol of compounds of the general Formulae IV or IV and V, by replacing the third halogen atom in known way by several groups such as by low molecular weight alkyl or haloalkyl residues (e.g., by Grignard) or by alkoxy, alkenyloxy, alkylmercapto or alkenylmercapto residues. The last-mentioned replacement may be effected by reaction in the presence of acid-binding agents with compounds of the general formula

H—Y—R VI in which Y represents oxygen or sulphur and R represents a lower alkyl or alkenyl group.

It is also possible, however, to start from known halo-s-triazines which already contain at least one residue X other than halogen and/or

and to introduce into such compounds a substituted hydroxylamine group by reaction with a hydroxylamine derivative of the general Formula IV.

Compounds of general Formula III, as mentioned above, have fungicidal activity but are particularly excellently suitable as active ingredients for weed control agents both for the selective suppression and extermination of weeds among cultivated plants and for the total destruction and prevention of undesired plant growth. By weeds in this connection are also meant undesired, e.g. previously grown, cultivated plants. Examples of weeds within the scope of this aspect that can be treated with the compounds of general Formula III are chicory, cucumber, celery, *Matricaria chamomilla, Raphanus raphthistrum, Capsella bursapastris, Stellaria media, Chenopodium album, Amaranthus lividus, Pentage media* etc.

The compounds of the general Formula III also have a marked selective action on cultivated plants. On treatment of plants with a representative compound of this aspect of the invention, it has been found that lucerne, rape, cotton, red clover, radish, maise and vetch remain undamaged while wheat, barley, raygrass, linen, carrots, leeks, cauliflower and beans are only very slightly damaged.

The compounds of general Formula III can also be used as active substances to effect restrictions on plant growth, e.g., for defoliation, for example, of cotton plants, and for dehydration, e.g., of potato plants, and also for reduction of the amount of fruit formed and for prolonging the storability.

Compounds of Formula III can be used in known ways, either per se or in combination with conventional inert agricultural adjuvants, e.g., the usual pulverulent solids, semi-solid (salve-like), liquid or gaseous carriers, diluents, and/or distributing (dispersing) agents.

The active substances according to the second aspect of the invention can be made for example into weed control agents in the form of solutions, emulsions, suspensions, dusts or granulates, which ensure a fine dissemination of the active substances during application; the forms of application depend entirely upon the purposes for which they are to be used. When the total destruction of plant growth, drying and defoliation are intended, the action may be increased by admixture with phytotoxic carrier substances, such as, for example, high-boiling mineral oil fractions; if a selective inhibition of the plant growth is aimed at, the use of carriers inert towards plants is indicated.

For the preparation of solutions, higher boiling organic liquids, such as mineral oil fractions, coal tar oils, and also vegetable and animal oils are especially suitable. In order to facilitate the solution of the active substances in these liquids, small amounts of organic liquids with a better dissolving power and usually a lower boiling point can be added if necessary, i.e., solvents such as alcohols, e.g., ethanol or isopropanol, ketones, e.g., acetone, butanone or cyclohexanone, diacetone, alcohol, cyclic hydrocarbons, e.g., benzene, toluene or xylene, chlorinated hydrocarbons, e.g., tetrachlorethane or ethylene chloride, or mixtures of the above-named substances.

The most important aqueous forms of application are emulsions and dispersions. The substances are homogenised in water as finely dispersed solids or as a solution in one of the above-mentioned solvents, preferably by means of emulsifying of dispersing agents. As examples of cationic emulsifying or dispersing agents may be mentioned quaternary ammonium compounds, as examples of anionic emulsifying agent, soap, soft soap, alkali metal salts of aliphatic long-chain sulphoric acid mono-esters, of aliphatic-aromatic sulphonic acids, or of long-chain alkoxyacetic acids, and as non-ionic emulsifying agents, polyethylene glycol ethers of fatty alcohols or alkylphenols and polycondensation products of ethylene oxide. On the other hand, liquid or paste-like concentrates consisting of active substance, emulsifying or dispersing agent and if necessary solvent, may also be made which are suitable for dilution with water.

Dusts and scattering agents, the latter also including granulates, may be made by mixing or grinding together the active substance with a solid carrier substance. Suitable carriers are talcum, diatomaceous earths, kaolin, bentonite, calcium carbonate, tricalcium phosphate, sand, and also sawdust, cork powder and other materials of vegetable origin. On the other hand, the substances may also be mounted on the carriers by means of a volatile solvent. By addition of wetting agents, e.g., the above-mentioned emulsifying agents, and protective colloids, e.g., spent sulphite liquor, pulverulent compositions and pastes which can be suspended in water and used as sprays may be made.

The various forms of application may be more closely adapted to the purposes of use in the usual way by addition of substances which improve or reduce the distribution and the power of penetration into the soil according to the length of root of the weeds to be controlled. Their biological action can likewise be broadened by addition of substances with bactericidal or fungicidal properties, e.g., to attain a general sterilisation of the soil, or in selective weed control, to protect the cultivated plants from other harmful organisms. Substances which also influence the growth of the plants, as, for example, 3-amino-1,2,4-triazole, for the acceleration of the beginning of the action or as, for example, salts of $\alpha,\alpha$-dichloropropionic acid, if necessary for the broadening of the spectrum of herbicidal action, may be desired. Combination with fertilisers in some cases represents a saving of work and may increase the resistance of the cultivated plants to be protected.

The following examples illustrate the preparation of some representative active substances to be used according to both aspects of the invention as well as typical forms of application and results had. Parts therein represent parts by weight and the temperatures are given in degrees centigrade.

Optimal herbicidal activity is possessed by the compounds of the formula

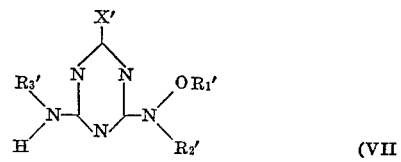

(VII)

wherein

X′ is halogen, lower alkoxy and lower alkylmercapto,
$R_1'$ is lower alkyl,
$R_2'$ is hydrogen or lower alkyl, and
$R_3'$ is ethyl or iso-propyl.

Example 1

43 parts of cyanuric chloride (1 equivalent) are dissolved in 500 parts of benzene. A solution of 11 parts (1 equivalent) of O-methyl-hydroxylamine (methoxyamine) in 300 parts by volume of benzene is dropped into the above solution at 2° to 5°. Then 9.4 parts of NaOH in 100 parts of water are dropped in at 4–5° with stirring. After the mixture has been stirred for a further ten hours at 5° and 3 hours at 20°, the phases are separated and the benzene phase is washed with water. After drying the benzene solution over $Na_2SO_4$, the benzene is distilled off and the solid residue is recrystallised from carbon tetrachloride. The 2,4 - dichloro - 6 - methoxyamino - s-triazine so obtained melts at 152–154°.

Example 2

312 parts of cyanuric chloride (1 equivalent) are dissolved in 4000 parts of benzene and 254 parts (2 equivalents, one of which being in excess for binding the HCl formed) of O-methyl-N-ethyl-hydroxylamine in 400 parts of benzene are dropped in at 3–6°. After the mixture has been stirred for a further 20 hours at 7°, the benzene solution is washed with ice water, dried with sodium sulphate and the benzene distilled off. The residue is recrystallised from petrol ether. The 2,4-dichloro-6-(N-methoxy-ethylamino)-1,3,5-triazine so obtained melts at 90–94°.

In a similar way to that described in the above examples, 2,4 - dichloro - 6 - isopropoxyamino - s - triazine of melting point 128–130° (from petrol ether) is obtained by reaction of 1 mol cyanuric chloride with O-isopropyl-hydroxylamine (isopropoxyamine); by reacting cyanuric chloride with one mol of N,O-dimethylhydroxylamine, 2,4 - dichloro - 6 - (N - methoxy - methylamino)-1,3,5-triazine is obtained (M.P. 74–75°) and by reacting cyanuric chloride with one mol of N,O-diethyl-hydroxylamine, 2,4 - dichloro - 6 - (N - ethoxy - ethylamino) - 1,3,5-triazine is obtained (M.P. 79–82°).

Example 3

A solution of 130 parts (2 equivalents) of N,O-diethyl-hydroxylamine in 130 parts of benzene is dropped at 20° to 25° into a solution of 135 parts of cyanuric chloride (1 equivalent) in 3000 parts of benzene. A precipitate of the hydrochloride of N,O-diethyl-hydroxylamine is formed. Then 115 parts of sodium hydroxide dissolved in 1000 parts of water are dropped in with stirring. After the mixture has been heated for 24 hours at 50°, the phases are separated and the benzene phase is washed with water and dried over sodium sulphate. After distilling off the solvent, the 2 - chloro - 4,6 - bis - (N - ethoxy-ethylamino)-1,3,5-triazine, obtained in good yield, is recrystallised from isopropyl ether. It melts at 75–77°.

In the same way are obtained:

from cyanuric chloride and 2 mols of N,O-dimethyl-hydroxylamine: 2 - chloro-4,6 - bis - (N - methoxy-methylamino)-1,3,5-triazine, M.P. 63–65° (from petrol ether), B.P. 95–100°/0.003 mm. Hg;

from cyanuric chloride and 2 mols of isopropoxyamine: 2 - chloro - 4,6 - bis - (isopropoxyamino) - 1,3,5 - triazine, M.P. 148–151° (from benzene);

from cyanuric chloride and 2 mols of methoxyamine: 2 - chloro - 4,6 - bis - (methoxyamino) - 1,3,5 - triazine, M.P. 180° with decomposition (from ethyl acetate);

from cyanuric chloride and 2 mols of allyloxyamine: 2 - chloro - 4,6 - bis - (allyloxyamino) - 1,3,5 - triazine, M.P. 200–201°;

from cyanuric fluoride and 2 mols of isopropoxyamine: 2 - fluoro - 4,6 - bis - (isopropoxyamino) - 1,3,5 - triazine, M.P. 170°;

from cyanuric fluoride and 2 mols of O,N-diethyl-hydroxylamine: 2 - fluoro - 4,6 - bis - (N - ethoxy-ethylamino) - 1,3,5 - triazine, B.P. 92–99°/0.04 mm. Hg;

from cyanuric bromide and 2 mols of O,N-diethyl-hydroxylamine: 2 - bromo - 4,6 - bis - (N - ethoxy - ethylamino) - 1,3,5 - triazine, M.P. 81–85°.

If the 2,4 - dichloro - 6 - isopropoxyamino - s - triazine (M.P. 128–130°) obtained according to Example 2 by reaction of cyanuric chloride with 1 mol of isopropoxyamine, is reacted with a further mol of O,N-diethyl-hydroxylamine in a similar manner, then 2-chloro-4-(N-ethoxy-ethylamino) - 6 - isopropoxyamino - 1,3,5 - triazine (M.P. 60°) is obtained.

If 1 mol of cyanuric chloride is first reacted in the known manner with one mol of C₃H₇Mg Br according to Grignard then 2,4 - dichloro - 6 - n - propyl - 1,3,5 - triazine is obtained. If the latter is reacted with 2 mols of N,O-diethyl-hydroxylamine, then 2-n-propyl-4,6-bis-(N-ethoxy-ethylamino) - 1,3,5 - triazine is obtained, B.P. 107–113°/0.07 mm. Hg.

In the same way, 2-ethyl-4,6-bis-(isopropoxyamino)-1,3,5-triazine (M.P. 102–105°) is obtained from 2,4-dichloro-6-ethyl-1,3,5-triazine and 2 mols of isopropoxyamine.

In the production of compounds obtained by reaction of one mol of each of a hydroxylamine derivative of Formula IV and an amine of Formula V, generally for economic reasons first the amine of Formula V is reacted with the cyanuric acid halide, in particular cyanuric chloride. The resultant 2,4-dihalogen-6-amino-s-triazines are known compounds and are further reacted as follows.

Example 4

193 parts of 2,4-dichloro-6-ethylamino-1,3,5-triazine (1 equivalent) are dissolved in 2000 parts of toluene. A solution of 75 parts of isopropoxyamine (1 equivalent) in 500 parts of toluene is dropped into the above solution at 5°, and then 40 parts of sodium hydroxide in 400 parts of water are added. After the mixture has been heated at 40–50° for 21 hours, the phases are separated. The organic phase is washed with water, dried with sodium sulphate and distilled. The distillation residue, 2-chloro-4-ethylamino-6-isopropoxyamino-1,3,5-triazine is recrystallised from hexane and melts at 158–160°. In a similar way were obtained:

from 2,4-dichloro-6-ethylamino-1,3,5-triazine and O,N-diethylhydroxylamine: 2-chloro-4-ethylamino-6-(N-ethoxy-ethylamino)-1,3,5-triazine, M.P. 113–115° (from cyclohexane);

from 2,4-dichloro-6-allylamino-1,3,5-triazine and O,N-dimethylhydroxylamine: 2-chloro-4-allylamino-6-(N-methoxy-methylamino)-1,3,5-triazine, M.P. 92–94°;

from 2,4-dichloro-6-isopropylamino-1,3,5-triazine with the corresponding O,N-substituted hydroxylamines, the following compounds: 2-chloro-4-isopropylamino-6-isopropoxyamino-1,3,5-triazine, M.P. 144–147°; 2-chloro-4-isopropylamino-6-(N-methoxy-methylamino)-1,3,5-triazine, B.P. 114–118°/0.04 mm. Hg; 2 - chloro-4-isopropylamino-6-(N-ethoxy-ethylamino)-1,3,5-triazine, B.P. 115–118°/0.01 mm. Hg; 2-chloro-4-isopropylamino-6-methoxyamino-1,3,5-triazine, M.P. 139–141°;

from 2,4-dichloro-6-(N-acetyl-ethylamino)-1,3,5-triazine (produced by reaction of a suspension of 1 equivalent of lithium amide and 1 equivalent of N-ethylacetamide in toluene with 1 equivalent of cyanuric chloride) and isopropoxyamine: 2-chloro-4-(N-acetyl-ethylamino)-6-isopropoxyamino1,3,5-triazine, M.P. 127–130°.

Example 5

221 parts of 2,4-dichloro-6-diethylamino-1,3,5-triazine (1 equivalent) are dissolved in 2000 parts of benzene and into this solution are dropped 150 parts of isopropoxyamine (2 equivalents as excess to bind the hydrochloric acid formed) in 1000 parts of benzene at 22°. After heating at 40–50° for 18 hours, the benzene solution is washed with water and dried with sodium sulphate. After distilling off the benzene, the crystalline residue is recrystallised from cyclohexane. The 2-chloro-4-diethylamino-6-isopropoxyamino-1,3,5-triazine melts at 143–145°.

Example 6

4,6-dichloro-2-ethyl-1,3,5-triazine is produced in the known way according to Grignard by reaction of one mol of cyanuric chloride and one mol of $C_2H_5MgBr$ and this triazine is converted into 2 - ethyl - 4 - isopropylamino-6-chloro-1,3,5-triazine by reaction with one mol of isopropylamine. From this compound, 2-ethyl-4-isopropylamino-6-(N - ethoxy - ethylamino)-1,3,5-triazine (B.P. 90–98°/0.1 mm. Hg) is obtained by reaction with O,N-diethyl-hydroxylamine, and 2-ethyl-4-isopropylamino-6-isopropoxyamino-1,3,5-triazine (M.P. 119–121°, from hexane) is obtained by reaction with isopropoxyamine.

Example 7

0.95 part of sodium are dissolved in 50 parts of absolute methanol and this solution is dropped at 20° into a solution in 150 parts of methanol of 12 parts of the 2-chloro-4-,6-bis-(N-ethoxy-ethyl amino)-1,3,5-triazine obtained according to Example 3. After boiling under reflux for 24 hours, the methanol is distilled off, the residue is dissolved in ether and the solution is washed with water. After drying with sodium sulphate the ether is distilled off. The 2-methoxy-4,6-bis-(N-ethoxy-ethylamine)-1,3,5-triazine obtained in good yield as residue is distilled at 117–120°/0.02 mm.

The following compounds which do not contain any halogen substituents are obtained in a similar manner by replacement of the last halogen atom by other radicals:

from 2 - chloro-4-isopropylamino-6-methoxyamino-1,3,5-triazine (M.P. 139–141°) mentioned in Example 4.

Example 8

2–5 parts of 2,4-dichloro-6-(N-ethoxy-ethylamino)-s-triazine are ground with 98–95 parts of talcum. The pulverulent fungicide obtained can be used, for example, for the dusting of plants or parts thereof such as bulbs and tubers. It exerts a very good activity against *Plasmopora viticola* on vine stams, and against *Erysiphe polyphaga* on cucumber plants.

Example 9

By grinding together 10 parts of 2,4-dichloro-6-isopropoxyamino-s-triazine and 82 parts of kaolin or chalk and mixing with 8 parts of wetting and dispersing agents, e.g., 5 parts of sulphite waste liquor and 3 parts of ethylene oxide condensation products of alkyl phenols, a concentrate is obtained which, on mixing with water, produces a fungicidal spray which is excellently suitable for the treatment of the parts of plants above ground.

Example 10

50 parts of 2,4-dichloro-6-(N-ethoxy-ethylamino)-s-triazine are mixed with 10–15 parts of a protective colloid, e.g. dried sulphite waste liquor, 5–10 parts of an adhesive and, possibly of a wetting agent and 30–35 parts of a pulverulent carrier such as, e.g., kaolin, Champagne chalk or bentonite and the mixture is ground in a Kolloplex mill to a particle size of about 20–30$\mu$. Suspended in a concentration of 0.1 to 0.5% in water, the spray powder obtained is excellently suitable for the control of fungi on parts of plants above ground.

Example 11

10 parts of active substance, e.g., 2-chloro-4,6-bis-(isopropoxyamino)-1,3,5-triazine, and 90 parts of talc are ground as finely as possible in a ball mill, a pinned disc mill or another suitable mill. The mixture obtained serves as a herbicidal dust.

Example 12

20 parts of active substance, e.g., 2-n-propyl-4,6-bis-(N-ethoxy-ethylamino)-1,3,5-triazine, are dissolved in a mixture of 48 parts of diacetone alcohol, 16 parts of xylene and 16 parts of an anhydrous, high-molecular weight condensation product of ethylene oxide with higher fatty acids. This concentrate may be diluted with water to give emulsions of any desired concentration which may be used for weed killing.

Example 13

50–80 parts of active substance, e.g., 2-chloro-4-methoxyamino-6-isopropylamino-1,3,5-triazine, are mixed with 2–5 parts of a wetting agent, e.g., a sulphuric acid ester of an alkyl-polyglycol ether, 1–5 parts of a protective colloid, e.g., spent sulphite liquor, and 14–44 parts of an inert solid carrier material, such as, for example, kaolin, bentonite, chalk or kieselguhr, and are finely ground in a suitable mill. The wettable powder obtained may be mixed with water and gives very stable herbicidal suspensions.

Example 14

10 parts of active substance, e.g., 2-methoxy-4,6-bis-(N-ethoxy-ethylamino)-1,3,5-triazine, are dissolved in 60–80 parts of a high-boiling organic liquid, such as, for example, coal tar oil, diesel oil or spindle oil, to which are added 30–10 parts of xylene; the solution serves for weed control.

Example 15

5–10 parts of 2-chloro-4-diethylamino-6-isopropoxyamino-1,3,5-triazine are mixed and ground with 95–100 parts of calcium carbonate (=ground limestone). The product may be used as a herbicidal scattering agent.

Example 16

95 parts of a granulated carrier material, e.g., sand or calcium carbonate, are moistened with 1–5 parts of water, isopropanol or polyethylene glycol and then mixed with 5 parts of 2-chloro-4,6-bis-(N-ethoxy-ethylamino)-1,3,5-triazine, whereby a good weed control agent is formed.

The above mixture or one richer in active substances, e.g., from 10 parts of active substance and 90 parts of calcium carbonate, may also be mixed with a multiple, e.g., 100–900 parts, of a possibly water-soluble artificial fertiliser, such as, for example, ammonium sulphate or urea.

Example 17

50 parts of active substance, e.g., 2-chloro-4-ethylamino-6-isopropoxyamino-1,3,5-triazine, are introduced into 45 parts of xylene and 5 parts of a mixture of polyethylene oxide condensation products and spent sulphite liquor are added. A concentrate is obtained for the preparation of herbicidal emulsions, which concentrate may be emulsified in water in any proportions.

The quantities of active substance needed per hectare in selective weed control may vary according to the sensitivity of the weeds, the resistance of the cultivated plants, the time of application, the climatic conditions and the soil conditions, between about 0.25 and 10 kg. per hectare, while for the complete prevention of plant growth 5–20 kg. per hectare have generally to be applied. In special cases the above quantities may also be exceeded.

The following examples describe the good plant growth inhibiting and herbicidal action of some active ingredients according to the invention.

Example 18

Seed boxes are filled with earth and the seeds of the following plants were placed in each box: mustard, sugar beet, spinach and cucumber. Immediately after planting the seeds, one gram of 2-chloro-4-ethylamino-6-(N-ethoxy-ethylamino)-1,3,5-triazine in 100 ml. of water is sprayed per square metre seed box surface, which corresponds to 10 kg. of active substance per hectare. Three weeks after planting, the seedlings of all four types of plants were killed.

Example 19

Various test plants are sown or set in a freshly prepared bed. Some time after shoots of the sown plants have appeared and after the settings have been set, the whole plant area is sprayed with 300 ml. of an aqueous preparation of 0.5 g. of 2-chloro-4-isopropylamino-6-methoxyamino-1,3,5-triazine per square metre, which corresponds to a concentration of 5 kg. of active substance per hectare. After 32 days, lucerne, rape, cotton, red clover, radish, maise and vetch are found to be undamaged, wheat, barley, raygrass, linen, carrots, leets, cauliflower and beans are only very slightly damaged, while chicory, cucumber and celery are very greatly damaged.

This active substance, in addition to this marked selective action on cultivated plants, also has an excellent action against the following weeds also present in the seed bed: *Matricaria chamimilla, Raphanus raphanistrum, Capsella bursa-pastoris, Stellaria media, Chenopodium album, Amaranthus lividus, Pentago media* etc. All these were completely killed and suppressed after 32 days.

Example 20

Leaves of windsor beans (*Vicia faba*) are treated with an aqueous suspension containing 0.1 percent of 2,4-dichloro-6-(N-ethoxyethylamino)-1,3,5-triazine. After allowing the leaves to dry, the leaves are infested with an aqueous suspension of the spores of the fungus. *Botrytis cinerea*, and stored in a moist chamber at room temperature. After forty-eight hours the infestation has taken place and is estimated on control plants and treated plants. The 2,4-dichloro-6-(N-ethoxyethylamino)-1,3,5-triazine inhibits the infestation totally (100 percent activity).

The foregoing examples are not intended to limit either aspect of the invention in any way. For example, the following compounds which do not contain any halogen substituents are obtained in a similar manner as set forth in Example 7 by replacement of the last halogen atom by other radicals:

2-methoxy-4-isopropylamine-6-methoxyamino-1,3,5-triazine, M.P. 84–86°;

also the salt is produced which forms this compound with trichloroacetic acid; this salt melts at 128–132°;

from 2-chloro-4,6-bis-(N-ethoxy-ethylamino)-1,3,5-triazine mentioned in Example 3: 2-methylmercapto- 4,6 - bis - (N - ethoxy-ethylamino)-1,3,5-triazine, B.P. 140–141°/0.03 mm. Hg.

We claim:
1. A member selected from the group consisting of a triazine derivative of the formula

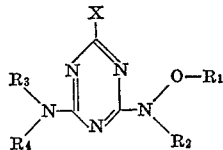

wherein
X is a member selected from the group consisting of halogen, lower alkoxy, lower alkenyloxy, lower alkylmercapto and lower alkenyl mercapto,
$R_1$ is a member selected from the group consisting of lower alkyl, lower alkenyl and lower alkinyl,
$R_2$ and $R_4$ are independently selected from a group consisting of hydrogen, lower alkyl and lower alkenyl, and
$R_3$ is a member selected from the group consisting of hydrogen, lower alkyl, lower alkenyl, lower alkanoyl and —$OR_1$
and the acid addition salts of said triazine derivative.

2. A compound of the formula

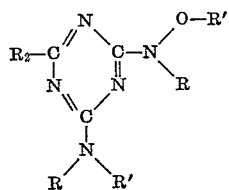

wherein
R is independently selected from the group consisting of hydrogen and lower alkyl
R' is lower alkyl, and
$R^2$ is selected from the group consisting of halogen, lower alkoxy and lower alkylmercapto.

3. A compound of the formula

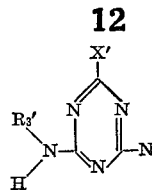

wherein
X' is a member selected from the group consisting of halogen, lower alkoxy and lower alkylmercapto,
$R_1'$ is lower alkyl,
$R_2'$ is a member selected from the group consisting of hydrogen and lower alkyl, and
$R_3'$ is a member selected from the group consisting of ethyl and iso-propyl.

4. The compound 2 - chloro-4-isopropylamino-6-methoxy-amino-1,3,5-triazine.

5. The compound 2-chloro-4-ethylamino-6-(N-ethoxy-N-ethylamino)-1,3,5-triazine.

6. The compound 2-chloro-4-ethylamino-6-isopropoxy-amino-1,3,5-triazine.

7. The compound 2-chloro - 4 - isopropylamino-6-(N-ethoxyethylamino)-1,3,5-triazine.

8. The compound 2-methoxy - 4 - isopropylamino-6-methoxyamino-1,3,5-triazine.

References Cited

UNITED STATES PATENTS

| | | | |
|---|---|---|---|
| 3,244,713 | 4/1966 | Dowbenko et al. | 260—249.6 XR |
| 3,277,065 | 10/1966 | Petropoulos et al. | 260—249.6 XR |
| 3,290,307 | 12/1966 | Keller et al. | 260—249.6 |
| 3,312,698 | 4/1967 | Dazzi et al. | 260—249.6 |
| 3,328,399 | 6/1967 | Prill | 260—249.6 XR |
| 3,364,215 | 1/1968 | Hackmann et al. | 260—249.6 XR |
| 3,385,854 | 5/1968 | Knusli et al. | 260—249.9 |

HENRY R. JILES, *Primary Examiner.*

JOHN M. FORD, *Assistant Examiner.*

U.S. Cl. X.R.

71—93; 242—249; 260—249.5, 249.9